United States Patent
Smith

(10) Patent No.: US 10,404,853 B2
(45) Date of Patent: Sep. 3, 2019

(54) SYSTEM AND METHOD FOR IMPLEMENTING SELF LEARNING CORRECTIONS CALL MONITORING

(71) Applicant: CenturyLink Intellectual Property LLC, Denver, CO (US)

(72) Inventor: Stephen R. Smith, Raleigh, NC (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 15/256,293

(22) Filed: Sep. 2, 2016

(65) Prior Publication Data

US 2017/0264739 A1    Sep. 14, 2017

Related U.S. Application Data

(60) Provisional application No. 62/305,791, filed on Mar. 9, 2016.

(51) Int. Cl.
  *H04M 3/22* (2006.01)
  *G10L 25/51* (2013.01)
  *H04M 3/42* (2006.01)

(52) U.S. Cl.
  CPC .......... *H04M 3/2281* (2013.01); *G10L 25/51* (2013.01); *H04M 3/42221* (2013.01); *H04M 2201/41* (2013.01)

(58) Field of Classification Search
  CPC .. H04M 3/2281; H04M 3/42221; H04M 3/38; H04M 2201/41; H04M 3/385; H04M 3/382; H04M 2203/6054; H04M 2201/40; H04M 3/2218; H04M 1/67; H04M 3/493; H04M 1/271; H04M 3/4936; H04M 2203/558; H04M 3/4211; H04M 3/56; H04M 17/10
  USPC ... 379/188, 88.02, 189, 8.01, 207.01, 32.01, 379/88.22, 202.01, 207.04, 377, 88.12, 379/93.03, 114.01, 114.2, 114.21, 142.05, 379/142.1, 146, 168, 194, 195, 196, 379/201.01, 207.06, 246, 265.01, 67.1,
  (Continued)

(56) References Cited

U.S. PATENT DOCUMENTS 7,248,680 B1 *  7/2007  Gainsboro ............... H04M 3/20
                                                          379/189
9,516,164 B1 * 12/2016  Keiser ................ G06Q 30/0261

(Continued)

*Primary Examiner* — Akelaw Teshale

(57) ABSTRACT

Novel tools and techniques might provide for implementing call monitoring, and, in particular embodiments, to methods, systems, apparatuses, and computer software for implementing self-learning corrections facility call monitoring. In some embodiments, a method might comprise an automated call monitor monitoring a voice or video call between a call participant and a prison inmate, and analyzing at least one of conversation content of the call, voice characteristics of the call participant and/or the prison inmate, and/or (for video calls) body language of the parties to the call, to determine whether the conversation content, voice characteristics, and/or body language are indicative of impermissible content and/or impermissible conduct (i.e., indicative of past, present, and/or future criminal behavior or acts, and the like). The automated call monitor might flag calls that present such indications of impermissible content and/or conduct, for review by corrections facility personnel, and might self-learn based on input by such personnel.

27 Claims, 9 Drawing Sheets

(58) Field of Classification Search
USPC ......... 379/68, 69, 88.08, 88.1, 88.14, 88.16, 379/88.23, 93.02
See application file for complete search history.

(56) References Cited

U.S. PATENT DOCUMENTS

| | | | | |
|---|---|---|---|---|
| 9,692,718 | B2* | 6/2017 | Bennett | .................... H04L 51/12 |
| 2003/0126470 | A1* | 7/2003 | Crites | ..................... G06F 21/55 |
| | | | | 379/114.14 |
| 2007/0071206 | A1* | 3/2007 | Gainsboro | .......... H04M 3/2281 |
| | | | | 379/168 |
| 2011/0059688 | A1* | 3/2011 | Noonan | ................ H04W 8/005 |
| | | | | 455/1 |
| 2011/0178803 | A1* | 7/2011 | Petrushin | ................ G10L 17/26 |
| | | | | 704/270 |
| 2011/0261941 | A1* | 10/2011 | Walters | ............... H04M 3/2281 |
| | | | | 379/188 |
| 2011/0286585 | A1* | 11/2011 | Hodge | .................... H04M 1/67 |
| | | | | 379/88.02 |
| 2013/0316738 | A1* | 11/2013 | Noonan | .................. H04W 4/90 |
| | | | | 455/456.4 |
| 2014/0194084 | A1* | 7/2014 | Noonan | ................ H04W 4/029 |
| | | | | 455/404.1 |
| 2014/0313275 | A1* | 10/2014 | Gupta | .................... H04N 7/141 |
| | | | | 348/14.06 |
| 2015/0022616 | A1 | 1/2015 | Talbot | |

* cited by examiner

SYSTEM AND METHOD FOR IMPLEMENTING SELF LEARNING CORRECTIONS CALL MONITORING

CROSS-REFERENCES TO RELATED APPLICATIONS

This application claims priority to U.S. Patent Application Ser. No. 62/305,791 (the "'791 application"), filed Mar. 9, 2016 by Stephen R. Smith, entitled, "Self Learning Corrections Call Monitoring," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing call monitoring, and, in particular embodiments, to methods, systems, apparatuses, and computer software for implementing self learning call monitoring in the corrections facility context.

BACKGROUND

Currently, there are many hundreds of thousands of calls a day between prison inmates—who are incarcerated in federal, state, and local correctional facilities—and friends, acquaintances, or family members. State Department of Corrections ("DOC") or Federal Bureau of Prisons ("BOP") personnel attempt to listen to call conversations for incidents or indications of threats, conspiracies, illegal drug trafficking, and/or the like. There are, however, many hundreds of conversations and a shortage of DOC or BOP personnel, thus making monitoring of calls difficult. Like highway patrol officers attempting to slow traffic by randomly choosing a road on which to catch speeders, random call monitoring of prison inmates may represent a waste of time and resources.

Hence, there is a need for more robust and scalable solutions for implementing call monitoring, and, in particular embodiments, to methods, systems, apparatuses, and computer software for implementing self learning call monitoring in the corrections facility context.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
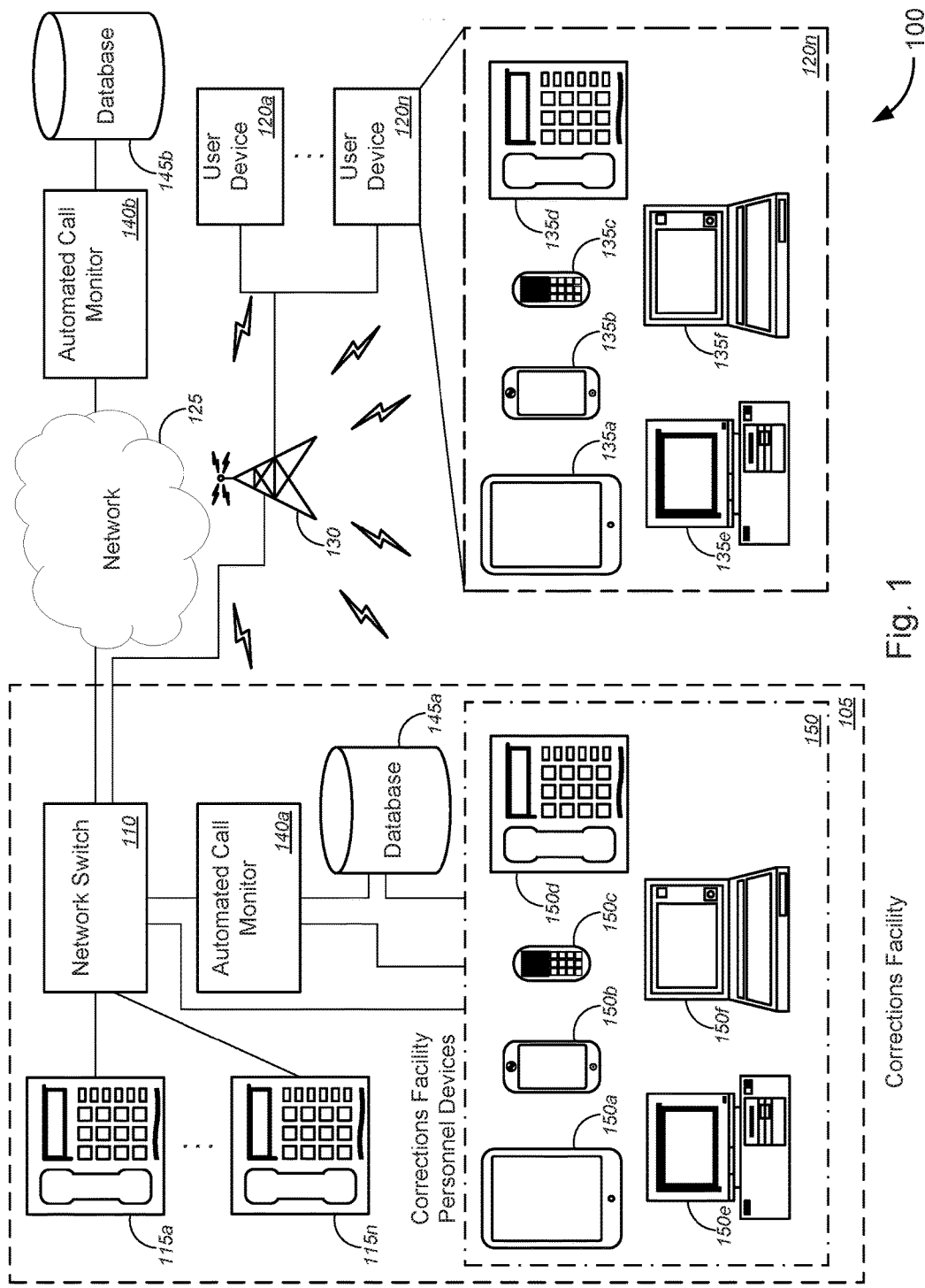
FIG. 1 is schematic diagrams illustrating a system for implementing self-learning corrections facility call monitoring, in accordance with various embodiments.

Various embodiments provide tools and techniques for implementing call monitoring, and, in particular embodiments, to methods, systems, apparatuses, and computer software for implementing self-learning corrections facility call monitoring.

In various embodiments, a method might comprise an automated call monitor monitoring a voice or video call between a call participant and a prison inmate, and analyzing at least one of conversation content of the call, voice characteristics of the call participant and/or the prison inmate, and/or (for video calls) body language of the parties to the call, to determine whether the conversation content, voice characteristics, and/or body language are indicative of impermissible content and/or impermissible conduct (i.e., indicative of past, present, and/or future criminal behavior or acts, and the like). The automated call monitor might flag calls that present such indications of impermissible content and/or conduct, for review by corrections facility personnel, and might self-learn based on input by such personnel as to whether or not the conversation content of the call, the voice characteristics of at least one of the call participant or prison inmate, and/or the body language of at least one of the call participant or prison inmate are individually or collectively indicative of impermissible content and/or impermissible conduct. Herein, "prison inmate" is, for the purposes of description, synonymous with "jailed individual," "incarcerated individual," or "prisoner" (regardless of what type of corrections facility he or she is held in, and thus refers to any male, female, or juvenile who is being incarcerated (or who had been incarcerated and whose calls had previously been monitored as part of the processes described herein) in a Federal, State, or Municipal corrections facility (i.e., jail or prison), which might be under the authority of the Federal Bureau of Prisons ("BOP"), the Department of Corrections ("DOC") for the particular state (or equivalent State-run agency), the local law enforcement agency or local government, respectively.

In some embodiments, impermissible content might include, without limitation, at least one of content related to threat of bodily harm, content related to threat of death, content related to blackmail, content related to conspiracy to commit a crime, content related to a past crime, content related to gang activity, or content related to drug trafficking, and/or the like. According to some embodiments, voice characteristics that are indicative of impermissible conduct comprise at least one of voice characteristics indicative of fear, voice characteristics indicative of anger, voice characteristics indicative of a threat, voice characteristics indicative of maliciousness, voice characteristics indicative of resignation, voice characteristics indicative of hesitation, low vocal tone, high pitched tone, vocal volume, vocal stutter, or growl, and/or the like. In some instances, body language that are indicative of impermissible conduct might include, without limitation, at least one of body language indicative of fear, body language indicative of anger, body language indicative of a threat, body language indicative of maliciousness, body language indicative of resignation, body language indicative of hesitation, tensed muscles, clenched teeth, angry eyes, sad eyes, fearful eyes, puffed chest muscles, huddled stance, looking away, staring with intensity, first pounding, foot stomping, looking down, avoiding eye contact, baring teeth, and/or the like.

Such self-learning autonomous monitoring system and method allows most, if not all calls to be monitored to determine which calls of the enormous number of calls each day need to be flagged, leaving the limited number of corrections facility personnel to focus mainly on the flagged calls to assess indications of impermissibility of content and/or conduct, as well as to forward to other personnel (e.g., warden, prosecutor, police, federal agents, etc.) to address such indications of impermissible content and/or conduct, particularly where threats of body harm, threats of death, drug-related activities, gang-related activities, and/or the like are involved. In keeping with the highway patrol analogy, this would be similar to noting average speed and average number of cars per mile, and dispatching highway patrol staff to the higher density roads where speeding is currently occurring or most likely to occur.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network technology, network communications technology, data packet routing/steering/forwarding technology, and/or the like. In other aspects, certain embodiments, can improve the functioning of user equipment or systems themselves (e.g., telecommunications equipment, network components, etc.), for example, by improving technologies for monitoring and flagging most, if not all, calls from/to prison inmates that are indicative of past, present, and/or future criminal acts or behavior, by allowing for self-learning by the system for continually (in some cases, iteratively) learning what types of words, speech, voice features, body language, and/or the like are indicative, or not indicative, of past, present, and/or future criminal acts or behavior, and/or the like. In particular, to the extent any abstract concepts are present in the various embodiments, those concepts can be implemented as described herein by devices, software, systems, and methods that involve specific novel functionality (e.g., steps or operations), such as analyzing conversation content, voice characteristics, and/or body language based on, e.g., comparisons with prior identified conversation content, voice characteristics, and/or body language that are (and are not) indicative of past, present, and/or future criminal acts or behavior, self-learning by analyzing similarities and differences amongst those calls (particularly, the individual components of the conversation content, the voice characteristics, or the body language, etc. of the calls) that are determined by the corrections facility personnel as being indicative of criminal acts and/or behavior and those calls that are determined by the corrections facility personnel as not being indicative of criminal acts and/or behavior, to name a few examples, that extend beyond mere conventional computer processing operations. These functionalities can produce tangible results outside of the implementing computer system, including, merely by way of example, enabling a greater number of calls of the hundreds of thousands of calls a day to/from prison inmates, enabling continually better identification of those calls that should be flagged and those calls that should not be flagged, freeing the limited number of corrections personnel to check mainly those calls that have been flagged, and/or the like, which may be observed or measured by customers and/or service providers.

In an aspect, a method might be provided for implementing self-learning corrections facility call monitoring. The method might comprise monitoring, with a computing system, a call between a call participant and a prison inmate; analyzing, with the computing system, conversation content of the call to determine whether the conversation content comprises impermissible content; and analyzing, with the computing system, voice characteristics of each of the call participant and the prison inmate evident during the call to determine whether the voice characteristics of at least one of the call participant or the prison inmate are indicative of impermissible conduct. The method might further comprise, based upon at least one of a determination that the conversation content comprises impermissible content or a determination that the voice characteristics of at least one of the call participant or the prison inmate are indicative of impermissible conduct, flagging, with the computing system, the call for review by corrections facility personnel.

In some embodiments, analyzing, with the computing system, the conversation content of the call to determine whether the conversation content comprises impermissible content might comprise analyzing, with the computing system, the conversation content of the call, by comparing the conversation content with at least one of a first set of conversation content that has previously been identified by corrections facility personnel as being impermissible content or a second set of conversation content that has previously been identified by corrections facility personnel as not being impermissible content.

According to some embodiments, the method might further comprise receiving, with the computing system, a first input from the corrections facility personnel regarding whether the conversation content constitutes impermissible content. The method might further comprise, based on a determination that the first input indicates that the conversation content constitutes impermissible content, updating, with the computing system, the first set of conversation content on a database; and, based on a determination that the first input indicates that the conversation content does not constitute impermissible content, updating, with the computing system, the second set of conversation content on the database.

In some instances, the method might further comprise analyzing, with the computing system, at least one of points of similarity and points of distinction between the conversation content and each of the first set of conversation content and the second set of conversation content, in view of the first input. In some cases, updating the first set of conversation content on the database might comprise updating, with the computing system, the first set of conversation content on the database, based at least in part on the first input and at least in part on the analysis of the at least one of points of similarity and points of distinction between the conversation content and each of the first set of conversation content and the second set of conversation content. Alternatively, or additionally, updating the second set of conversation content on the database might comprise updating, with the computing system, the second set of conversation content on the database, based at least in part on the first input and at least in part on the analysis of the at least one of points of similarity and points of distinction between the conversation content and each of the first set of conversation content and the second set of conversation content.

In some embodiments, analyzing, with the computing system, the voice characteristics of each of the call participant and the prison inmate evident during the call to determine whether the voice characteristics of at least one of the call participant or the prison inmate are indicative of impermissible conduct might comprise analyzing, with the computing system, the voice characteristics of each of the call participant and the prison inmate evident during the call, by comparing the voice characteristics of each of the call participant and the prison inmate with at least one of a first set of voice characteristics that has previously been identified by corrections facility personnel as being indicative of impermissible conduct or a second set of voice characteristics that has previously been identified by corrections facility personnel as not being indicative of impermissible conduct.

According to some embodiments, the method might further comprise receiving, with the computing system, a second input from the corrections facility personnel regarding whether the voice characteristics of the at least one of the call participant or the prison inmate constitutes indication of impermissible conduct; based on a determination that the second input indicates that the voice characteristics of the at least one of the call participant or the prison inmate constitutes indication of impermissible conduct, updating, with the computing system, the first set of voice characteristics on a database; and based on a determination that the second input indicates that the voice characteristics of the at least one of the call participant or the prison inmate does not constitute indication of impermissible conduct, updating, with the computing system, the second set of voice characteristics on the database.

In some instances, the method might further comprise analyzing, with the computing system, at least one of points of similarity and points of distinction between the voice characteristics of the at least one of the call participant or the prison inmate and each of the first set of voice characteristics and the second set of voice characteristics, in view of the second input. In some cases, updating the first set of voice characteristics on the database might comprise updating, with the computing system, the first set of voice characteristics on the database, based at least in part on the second input and at least in part on the analysis of the at least one of points of similarity and points of distinction between the voice characteristics of the at least one of the call participant or the prison inmate and each of the first set of voice characteristics and the second set of voice characteristics. Alternatively, or additionally, updating the second set of voice characteristics on the database might comprise updating, with the computing system, the second set of voice characteristics on the database, based at least in part on the second input and at least in part on the analysis of the at least one of points of similarity and points of distinction between the voice characteristics of the at least one of the call participant or the prison inmate and each of the first set of voice characteristics and the second set of voice characteristics.

Merely by way of example, in some embodiments, impermissible content might comprise at least one of content related to threat of bodily harm, content related to threat of death, content related to blackmail, content related to conspiracy to commit a crime, content related to a past crime, content related to gang activity, or content related to drug trafficking, and/or the like. According to some embodiments, voice characteristics that are indicative of impermissible conduct might comprise at least one of voice characteristics indicative of fear, voice characteristics indicative of anger, voice characteristics indicative of a threat, voice characteristics indicative of maliciousness, voice characteristics indicative of resignation, voice characteristics indicative of hesitation, low vocal tone, high pitched tone, vocal volume, vocal stutter, or growl, and/or the like.

In some instances, analyzing the conversation content of the call might comprise identifying, with the computing system, one or more coded messages by analyzing key words used by at least one of the call participant or the prison inmate across a plurality of monitored calls. In some cases, analyzing the voice characteristics of each of the call participant and the prison inmate might comprise identifying, with the computing system, one or more coded messages by analyzing voice characteristics of each of the call participant and the prison inmate in conjunction with key words used by at least one of the call participant or the prison inmate across a plurality of monitored calls.

According to some embodiments, analyzing the conversation content of the call might comprise analyzing, with the computing system, the conversation content of the call in view of a psychological profile of the prison inmate. In some instances, analyzing the voice characteristics of the prison inmate might comprise analyzing, with the computing system, the voice characteristics of the prison inmate in view of a psychological profile of the prison inmate.

In some cases, the method might further comprise recording the call, with the computing system, for further analysis regardless of whether the call is flagged for review by corrections facility personnel.

Merely by way of example, in some embodiments, the call might be a video call, and the method might further comprise analyzing, with the computing system, body language of each of the call participant and the prison inmate evident during the call to determine whether the body language of at least one of the call participant or the prison inmate is indicative of impermissible conduct. In such cases, flagging the call for review by corrections facility personnel might further be based upon a determination that the body language of at least one of the call participant or the prison inmate is indicative of impermissible conduct.

In another aspect, an apparatus might be provided for implementing self-learning corrections facility call monitoring. The apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: monitor a call between a call participant and a prison inmate; analyze conversation content of the call to determine whether the conversation content comprises impermissible content; analyze voice characteristics of each of the call participant and the prison inmate evident during the call to determine whether the voice characteristics of at least one of the call participant or the prison inmate are indicative of impermissible conduct; and, based upon at least one of a determination that the conversation content comprises impermissible content or a determination that the voice characteristics of at least one of the call participant or the prison inmate are indicative of impermissible conduct, flag the call for review by corrections facility personnel.

In some embodiments, analyzing the conversation content of the call to determine whether the conversation content comprises impermissible content might comprise analyzing the conversation content of the call, by comparing the conversation content with at least one of a first set of conversation content that has previously been identified by corrections facility personnel as being impermissible content or a second set of conversation content that has previously been identified by corrections facility personnel as not being impermissible content.

According to some embodiments, the set of instructions, when executed by the at least one processor, might further cause the apparatus to: receive a first input from the corrections facility personnel regarding whether the conversation content constitutes impermissible content; based on a determination that the first input indicates that the conversation content constitutes impermissible content, update the first set of conversation content on a database; and based on a determination that the first input indicates that the conversation content does not constitute impermissible content, update the second set of conversation content on the database.

In some cases, analyzing the voice characteristics of each of the call participant and the prison inmate evident during the call to determine whether the voice characteristics of at least one of the call participant or the prison inmate are indicative of impermissible conduct might comprise analyzing the voice characteristics of each of the call participant and the prison inmate evident during the call, by comparing the voice characteristics of each of the call participant and the prison inmate with at least one of a first set of voice characteristics that has previously been identified by corrections facility personnel as being indicative of impermissible conduct or a second set of voice characteristics that has previously been identified by corrections facility personnel as not being indicative of impermissible conduct.

In some instances, the set of instructions, when executed by the at least one processor, might further cause the apparatus to: receive a second input from the corrections facility personnel regarding whether the voice characteristics of the at least one of the call participant or the prison inmate constitutes indication of impermissible conduct; based on a determination that the second input indicates that the voice characteristics of the at least one of the call participant or the prison inmate constitutes indication of impermissible conduct, update the first set of voice characteristics on a database; and based on a determination that the second input indicates that the voice characteristics of the at least one of the call participant or the prison inmate does not constitute indication of impermissible conduct, update the second set of voice characteristics on the database.

Merely by way of example, in some embodiments, impermissible content might comprise at least one of content related to threat of bodily harm, content related to threat of death, content related to blackmail, content related to conspiracy to commit a crime, content related to a past crime, content related to gang activity, or content related to drug trafficking, and/or the like. According to some embodiments, voice characteristics that are indicative of impermissible conduct might comprise at least one of voice characteristics indicative of fear, voice characteristics indicative of anger, voice characteristics indicative of a threat, voice characteristics indicative of maliciousness, voice characteristics indicative of resignation, voice characteristics indicative of hesitation, low vocal tone, high pitched tone, vocal volume, vocal stutter, or growl, and/or the like.

In some instances, analyzing the conversation content of the call might comprise identifying one or more coded messages by analyzing key words used by at least one of the call participant or the prison inmate across a plurality of calls. In some cases, analyzing the voice characteristics of each of the call participant and the prison inmate might comprise identifying one or more coded messages by analyzing voice characteristics of each of the call participant and the prison inmate in conjunction with key words used by at least one of the call participant or the prison inmate across a plurality of calls.

According to some embodiments, analyzing the conversation content of the call might comprise analyzing the conversation content of the call in view of a psychological profile of the prison inmate. In some instances, analyzing the voice characteristics of the prison inmate might comprise analyzing the voice characteristics of the prison inmate in view of a psychological profile of the prison inmate.

Merely by way of example, in some cases, the set of instructions, when executed by the at least one processor, might further cause the apparatus to record the call for further analysis regardless of whether the call is flagged for review by corrections facility personnel.

In yet another aspect, a system might be provided for implementing self-learning corrections facility call monitoring. The system might comprise a prison telephone in communication with an external telephone, a call being established between a call participant using the external telephone and a prison inmate using the prison telephone. The system might further comprise an automated call monitor, comprising at least one processor and a non-transitory computer readable medium communicatively coupled to the at least one processor. The non-transitory computer readable medium might have stored thereon computer software comprising a set of instructions that, when executed by the at least one processor, causes the automated call monitor to: monitor the call between the call participant and the prison inmate; analyze conversation content of the call to determine whether the conversation content comprises impermissible content; analyze voice characteristics of each of the call participant and the prison inmate evident during the call to determine whether the voice characteristics of at least one of the call participant or the prison inmate are indicative of impermissible conduct; and based upon at least one of a determination that the conversation content comprises impermissible content or a determination that the voice characteristics of at least one of the call participant or the prison inmate are indicative of impermissible conduct, flag the call for review by corrections facility personnel.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing call monitoring, and, in particular embodiments, to methods, systems, apparatuses, and computer software for implementing self-learning corrections facility call monitoring, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is schematic diagrams illustrating a system 100 for implementing self-learning corrections facility call monitoring, in accordance with various embodiments. In FIG. 1, system 100 might comprise a corrections facility 100, such as a Federal, State, or Municipal corrections facility (i.e., jail or prison), which might be under the authority of the Federal Bureau of Prisons ("BOP"), the Department of Corrections ("DOC") for the particular state (or equivalent State-run agency), the local law enforcement agency or local government, respectively. The system 100 might further comprise a network switch 110, one or more telecommunications devices 115a-115n (collectively, "telecommunications devices 115"), one or more user devices 120a-120n (collectively, "user devices 120"), network 125, and one or more telecommunications relay systems 130. The network switch 110 and the one or more telecommunications devices 115 might be disposed in, at, or near the corrections facility 105, while the user devices 120 can be either located in, at, or near the corrections facility 105 or located at a (geographically) remote location relative to the corrections facility 105.

Merely by way of example, in some embodiments, the network(s) 120 might include, without limitation, one or more of a local area network ("LAN"), a wide area network ("WAN"), a wireless wide area network ("WWAN"), a virtual private network ("VPN"), a public switched telephone network ("PSTN"), a voice over Internet Protocol ("VoIP") data network, a data network, the Internet, or an extranet, and/or the like. The one or more telecommunications relay systems 130 might include, without limitation, one or more wireless network interfaces (e.g., wireless modems, wireless access points, and the like), one or more towers, one or more satellites, and/or the like.

The network switch 110 might establish or connect, via a wired and/or wireless connection, a call between one of the telecommunications devices 115 and one (or more) of the user devices 120, over network 125 (in some cases, via the one or more telecommunications relay systems 130). The call, in some cases, might be a voice call over a PSTN, a VoIP data network, a video call over a data network, and/or the like. Each of the one or more telecommunications devices 115 might include, but is not limited to, a telephone, a video phone, and/or the like. Each of the one or more user devices might include, without limitation, a tablet computer 135a, a smart phone 135b, a mobile phone 135c, a telephone 135d, a desktop computer 135e, a laptop computer 135f, and/or the like.

System 100 might further comprise an automated call monitor 140 and one or more databases 145. The automated call monitor 140 might include, without limitation, a local automated call monitor 140a that is located in, at, or near the corrections facility 105, and a remote automated call monitor 140b (which might be in a form of a server, distributed computing network (e.g., cloud computing system, etc.), or the like) that is located in a (geographically) remote location, or a combination of local and remote systems. Likewise, the one or more databases 145 might include, but are not limited to, a local database(s) 145a that is located in, at, or near the corrections facility 105, and a remote database(s) 145b that is located in a (geographically) remote location, or a combination of local and remote data storage systems.

In operation, the automated call monitor 140 (either local 140a or remote 140b, or both) might monitor a call between a call participant using one of the user devices 120 or 135 and a prison inmate using one of the telecommunications devices 115. The automated call monitor 140 might analyze conversation content of the call to determine whether the conversation content comprises impermissible content, analyze voice characteristics of each of the call participant and the prison inmate evident during the call to determine whether the voice characteristics of at least one of the call participant or the prison inmate are indicative of impermissible conduct, (and in the case of video calls), analyze body language of each of the call participant and the prison inmate evident during the call to determine whether the body language of at least one of the call participant or the prison inmate is indicative of impermissible conduct, and/or a combination of these analyses, or the like.

Here, conversation content might include the words (in any language) spoken by the call participant and the prison inmate, and might, in some cases, also include, but are not limited to, vocalizations that are not words, background noises or sounds, and/or the like that are evident or otherwise picked up by the calling device (i.e., by one or both of the telecommunications device or the user device). Impermissible content, in some embodiments, might include, without limitation, at least one of content related to threat of bodily harm, content related to threat of death, content related to blackmail, content related to conspiracy to commit a crime, content related to a past crime, content related to gang activity, or content related to drug trafficking, and/or the like.

Here also, voice characteristics might include, without limitation, intonation, tone, pitch, timbre, loudness, volume, stutter, pauses between words or sentences, accent, grunts, growls, unique vocal features, cadence, speech fluency, speech disfluency (i.e., use of filler words, like "um," "huh," "uh," "well," "like," or the like, or their equivalents in other languages), mingling of languages, and/or the like, or any combination of these characteristics. According to some embodiments, voice characteristics that are indicative of impermissible conduct comprise at least one of voice characteristics indicative of fear, voice characteristics indicative of anger, voice characteristics indicative of a threat, voice characteristics indicative of maliciousness, voice characteristics indicative of resignation, voice characteristics indicative of hesitation, low vocal tone, high pitched tone, vocal volume, vocal stutter, or growl, and/or the like.

Further herein, body language might include, but not limited to, movement or state of the head (e.g., tilting of the head upward, downward, to the right-side, to the left-side, or a combination of such movements, and/or the like), movement or state of the eye(s) (e.g., to look straight at the camera (which might imply looking at other person in the video call), to look to the top portion of the screen/camera, to look at the bottom portion of the screen/camera, to look to the sides of the screen/camera, blinking, winking, squinting, staring, dilating, open in fear, wrinkled around the eyes in amusement, or a combination of such movements, and/or the like), movement of the nose (i.e., snorting, expelling breath, and/or the like), movement of the mouth other than talking (e.g., snarling, clenching teeth, baring teeth, biting, licking lips, licking teeth, sticking out the tongue, or any combination of these actions, and/or the like), movement or state of the torso (e.g., toward, away, upward, downward, turned, and/or a combination of these actions relative to the screen/camera, and/or the like), movement of the arms (e.g., bent, straightened, swinging, lifted, against the sides, neutral, hanging, relaxed, upward, downward, to the sides, punching, fist-pounding, hammering, surrendering, closed, folded, open, stretched wide, or a combination of these actions, and/or the like), movement or state of the hands (e.g., closing hand(s) in a fist(s), clenching fists, scratching, swiping, pushing, pulling, slapping, saluting, knuckle-cracking, chopping, jabbing, finger-pointing, finger-stabbing, open handed, claw-like, movement or state of the fingers, or a combination of these actions, and/or the like), movement or state of the body (e.g., tensing muscles, pacing, huddling, balling, jumping, leaning forward, leaning to the side, leaning back, tapping feet, shaking, shivering, twitching, or a combination of these actions, and/or the like), or a combination of these movements or states of body parts, and/or the like. According to some embodiments, body language that are indicative of impermissible conduct comprise at least one of body language indicative of fear, body language indicative of anger, body language indicative of a threat, body language indicative of maliciousness, body language indicative of resignation, body language indicative of hesitation, tensed muscles, clenched teeth, angry eyes, sad eyes, fearful eyes, puffed chest muscles, huddled stance, looking away, staring with intensity, first pounding, foot stomping, looking down, avoiding eye contact, baring teeth, and/or the like.

Based upon at least one of a determination that the conversation content comprises impermissible content, a determination that the voice characteristics of at least one of the call participant or the prison inmate are indicative of impermissible conduct, and/or (in the case of video calls) a determination that the body language of at least one of the call participant or the prison inmate is indicative of impermissible conduct, the automated call monitor 140 might flag the call for review by corrections facility personnel via one or more corrections facility personnel devices 150, which might be either located in, at, or near the corrections facility 105 (as shown in FIG. 1) or located at a (geographically) remote location relative to the corrections facility 105 (not shown). Each of the one or more corrections facility personnel devices 150 might include, without limitation, a tablet computer 150*a*, a smart phone 150*b*, a mobile phone 150*c*, a telephone 150*d*, a desktop computer 150*e*, a laptop computer 150*f*, and/or the like. The one or more corrections facility personnel devices 150 might receive input from corrections facility personnel after such individuals have reviewed flagged calls (either directly from the automated call monitor 140 or indirectly from the automated call monitor 140 via database 145, or the like), and might either store the received input in database(s) 145 or send the received input to the automated call monitor 140 for further analysis and self-learning (i.e., by using the received input as a data point in a plurality of data points to determine what conversation content constitutes impermissible content, what conversation content does not constitute impermissible content, what voice characteristics constitute indications of impermissible conduct, what voice characteristics do not constitute indications of impermissible conduct, what body language constitute indications of impermissible conduct, and what body language do not constitute indications of impermissible conduct, and/or the like). The automated call monitor 140 might subsequently update, in database 145, the various sets of conversation content, voice characteristics, and/or body language in accordance with its self-learning.

These and other operations of system 100 or processes of the method for implementing self-learning corrections facility call monitoring are described in greater detail below with respect to FIGS. 2A-4.

Figure 2A:
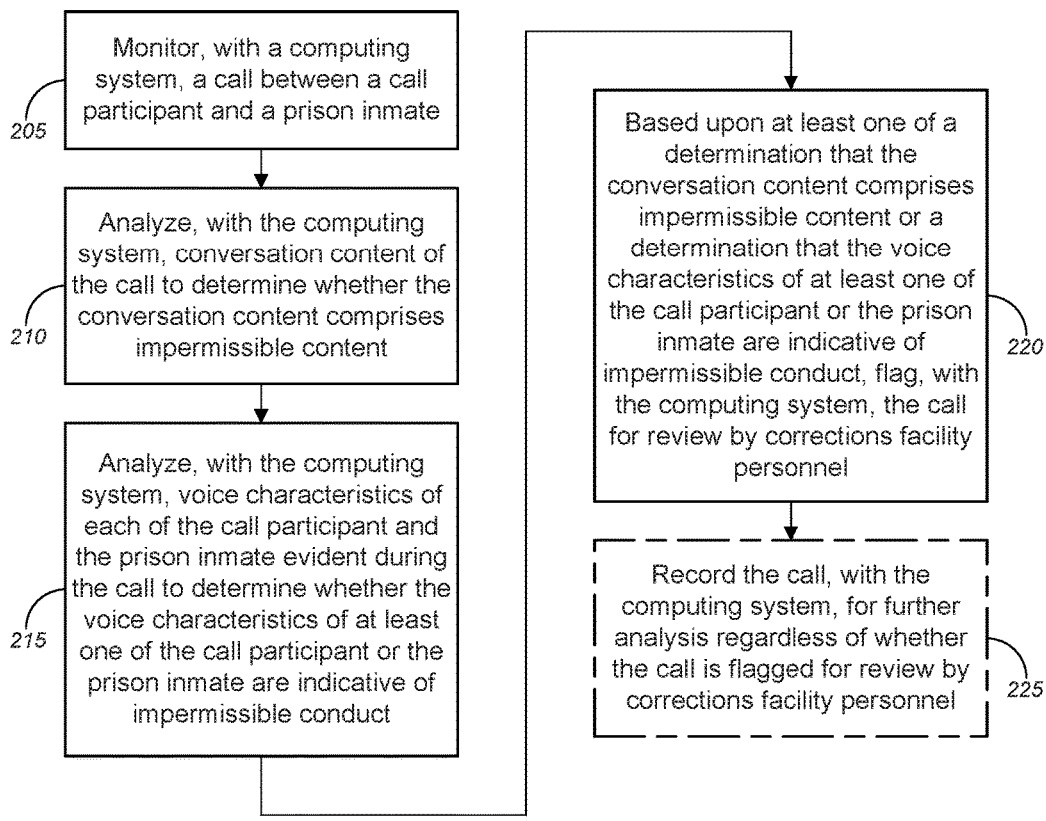
FIGS. 2A-2C are flow diagrams illustrating a method for implementing self-learning corrections facility call monitoring, in accordance with various embodiments.
Figure 2B:
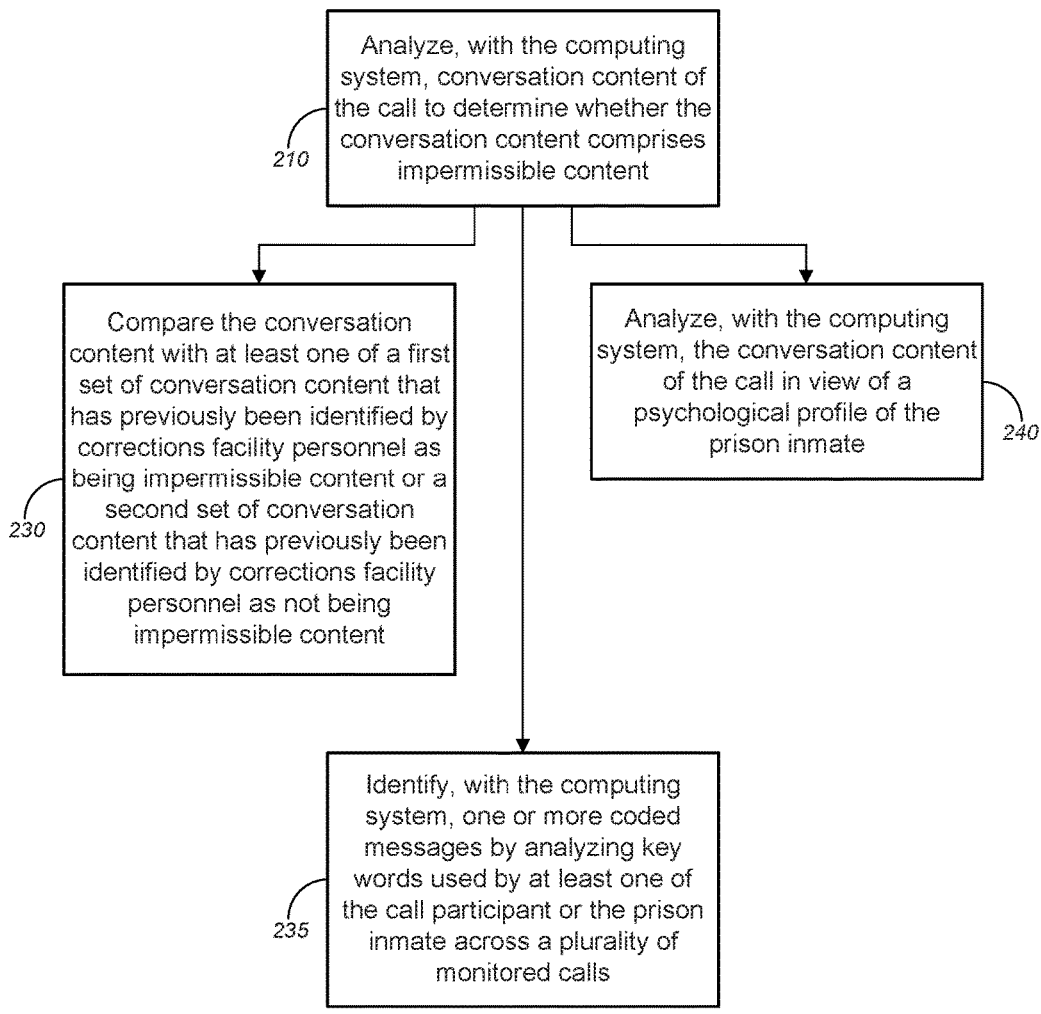
Figure 2C:
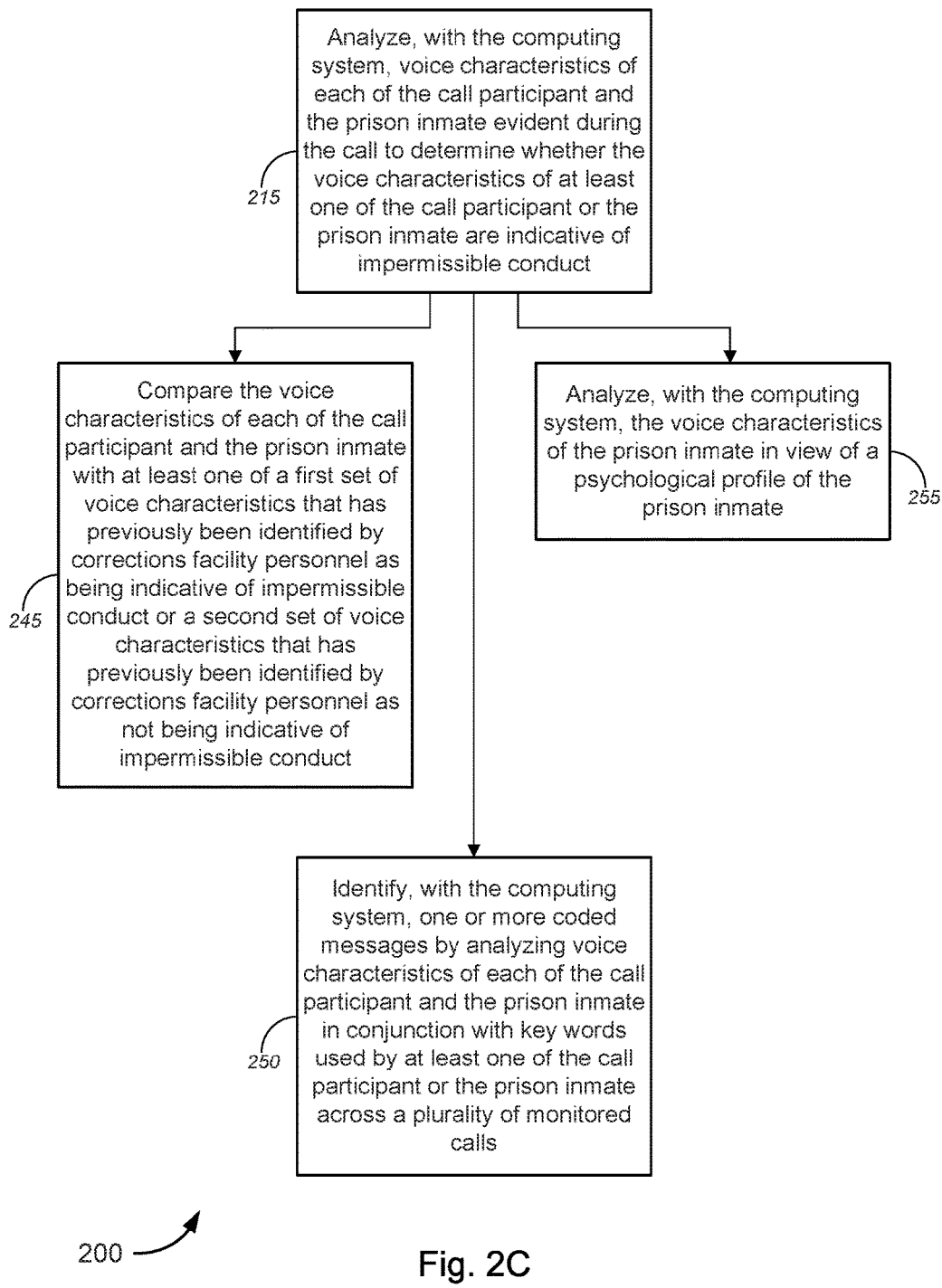

FIGS. 2A-2C (collectively, "FIG. 2") are flow diagrams illustrating a method 200 for implementing self-learning corrections facility call monitoring, in accordance with various embodiments. FIG. 2B depicts alternative embodiments for the process of analyzing conversation content of the call, while FIG. 2C depicts alternative embodiments for the process of analyzing voice characteristics of each of the call participant and the prison inmate evident during the call.

While the techniques and procedures are depicted and/or described in a certain order for purposes of illustration, it should be appreciated that certain procedures may be reordered and/or omitted within the scope of various embodiments. Moreover, while the method 200 illustrated by FIG. 2 can be implemented by or with (and, in some cases, are described below with respect to) the system 100 of FIG. 1

(or components thereof), such methods may also be implemented using any suitable hardware (or software) implementation. Similarly, while the system 100 of FIG. 1 (or components thereof) can operate according to the method 200 illustrated by FIG. 2 (e.g., by executing instructions embodied on a computer readable medium), the system 100 of FIG. 1 can each also operate according to other modes of operation and/or perform other suitable procedures.

Turning to FIG. 2A, method 200 might comprise, at block 205, monitoring, with a computing system (e.g., automated call monitor 140a or 140b of FIG. 1, or the like), a call between a call participant using a user device (e.g., user device 120a-120n, which might include, without limitation, a tablet computer 135a, a smart phone 135b, a mobile phone 135c, a telephone 135d, a desktop computer 135e, a laptop computer 135f, and/or the like, of FIG. 1, and the like) and a prison inmate using a telecommunications device (e.g., telecommunications device 115a-115n, which might include, but is not limited to, a telephone, a video phone, and/or the like, of FIG. 1, and the like). The call, in some cases, might be a voice call over a public switched telephone network ("PSTN"), a voice over Internet Protocol ("VoIP") call over a data network, a video call over a data network, and/or the like. Method 400 of FIG. 4, as described below, focuses on embodiments directed to video calls. According to some embodiments, the call participant might be a family member or relative, a friend, an acquaintance, a co-worker, a business associate, an employee, some other contact, and/or the like (collectively, "call participant"). The prison inmate might be a person (male or female, juvenile or adult) who is incarcerated in a Federal, State, or Municipal corrections facility (i.e., jail or prison), which might be under the authority of the Federal Bureau of Prisons ("BOP"), the Department of Corrections ("DOC") for the particular state (or equivalent State-run agency), the local law enforcement agency or local government, respectively.

At block 210, method 200 might comprise analyzing, with the computing system, conversation content of the call to determine whether the conversation content comprises impermissible content. As described above, conversation content might include the words (in any language) spoken by the call participant and the prison inmate, and might, in some cases, also include, but are not limited to, vocalizations that are not words, background noises or sounds, and/or the like that are evident or otherwise picked up by the calling device (i.e., by one or both of the telecommunications device or the user device). Impermissible content, in some embodiments, might include, without limitation, at least one of content related to threat of bodily harm, content related to threat of death, content related to blackmail, content related to conspiracy to commit a crime, content related to a past crime, content related to gang activity, or content related to drug trafficking, and/or the like. With reference to FIG. 2B, analyzing conversation content of the call to determine whether the conversation content comprises impermissible content might comprise one or more of: comparing the conversation content with at least one of a first set of conversation content that has previously been identified by corrections facility personnel as being impermissible content or a second set of conversation content that has previously been identified by corrections facility personnel as not being impermissible content (block 230); identifying, with the computing system, one or more coded messages by analyzing key words used by at least one of the call participant or the prison inmate across a plurality of monitored calls (block 235); analyzing, with the computing system, the conversation content of the call in view of a psychological profile of the prison inmate (block 240); and/or the like.

Turning back to FIG. 2A, method 200 might further comprise, at block 215, analyzing, with the computing system, voice characteristics of each of the call participant and the prison inmate evident during the call to determine whether the voice characteristics of at least one of the call participant or the prison inmate are indicative of impermissible conduct. As described above, voice characteristics might include, without limitation, intonation, tone, pitch, timbre, loudness, volume, stutter, pauses between words or sentences, accent, grunts, growls, unique vocal features, cadence, speech fluency, speech disfluency (i.e., use of filler words, like "um," "huh," "uh," "well," "like," or the like, or their equivalents in other languages), mingling of languages, and/or the like, or any combination of these characteristics. According to some embodiments, voice characteristics that are indicative of impermissible conduct comprise at least one of voice characteristics indicative of fear, voice characteristics indicative of anger, voice characteristics indicative of a threat, voice characteristics indicative of maliciousness, voice characteristics indicative of resignation, voice characteristics indicative of hesitation, low vocal tone, high pitched tone, vocal volume, vocal stutter, or growl, and/or the like. With reference to FIG. 2C, analyzing voice characteristics of each of the call participant and the prison inmate evident during the call to determine whether the voice characteristics of at least one of the call participant or the prison inmate are indicative of impermissible conduct might comprise one or more of: comparing the voice characteristics of each of the call participant and the prison inmate with at least one of a first set of voice characteristics that has previously been identified by corrections facility personnel as being indicative of impermissible conduct or a second set of voice characteristics that has previously been identified by corrections facility personnel as not being indicative of impermissible conduct (block 245); identifying, with the computing system, one or more coded messages by analyzing voice characteristics of each of the call participant and the prison inmate in conjunction with key words used by at least one of the call participant or the prison inmate across a plurality of monitored calls (block 250); analyzing, with the computing system, the voice characteristics of the prison inmate in view of a psychological profile of the prison inmate (block 255); and/or the like.

Turning back to FIG. 2A, method 200, at block 220, might comprise, based upon at least one of a determination that the conversation content comprises impermissible content or a determination that the voice characteristics of at least one of the call participant or the prison inmate are indicative of impermissible conduct, flagging, with the computing system, the call for review by corrections facility personnel. According to some embodiments, method 200 might further comprise recording the call, with the computing system, for further analysis regardless of whether the call is flagged for review by corrections facility personnel (optional block 225). In some cases, the call might be recorded in a database (e.g., database 145a or 145b in FIG. 1, or the like).

Figure 3A:
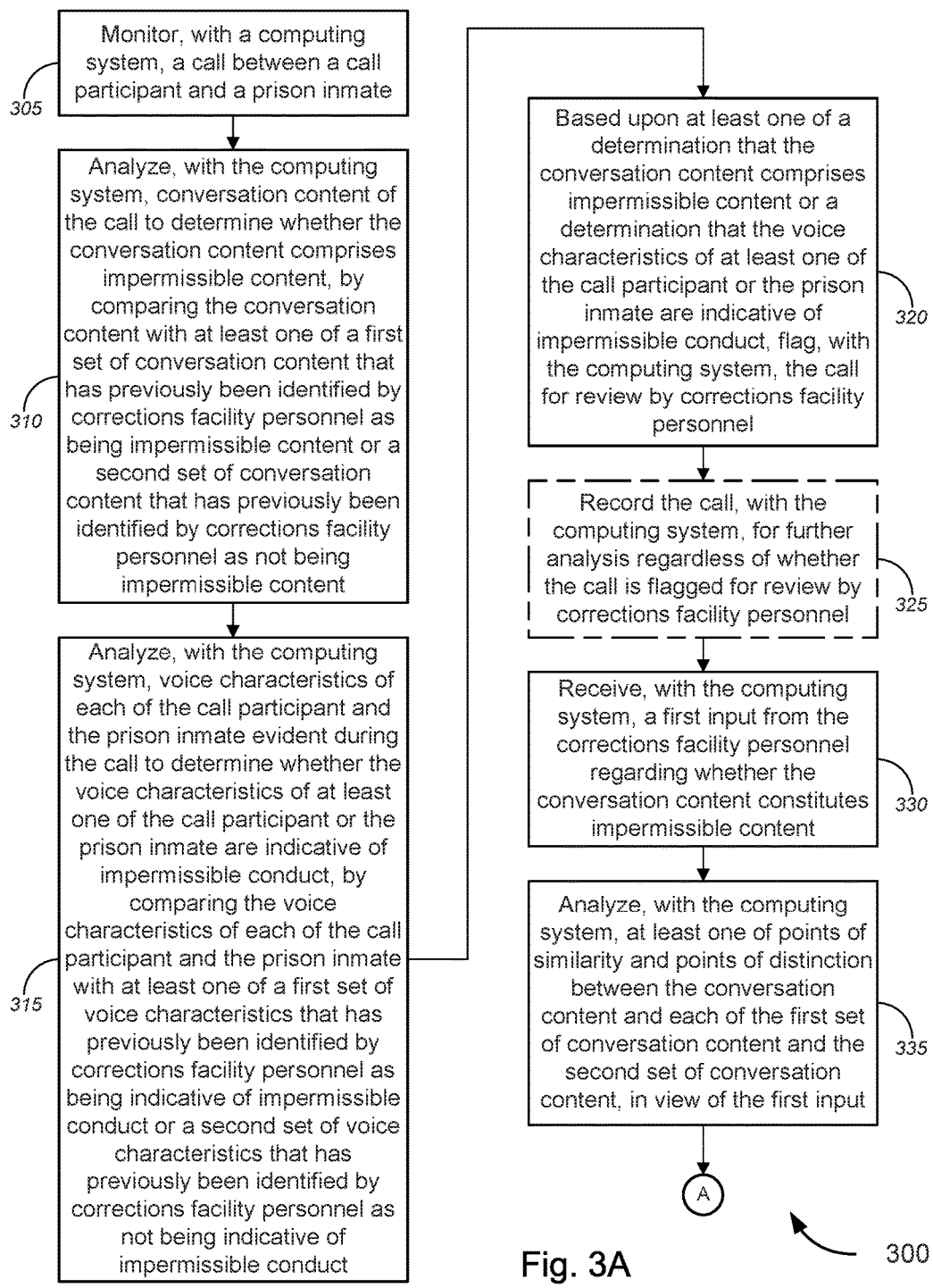
FIGS. 3A and 3B are schematic diagrams illustrating another method for implementing self-learning corrections facility call monitoring, in accordance with various embodiments.
Figure 3B:
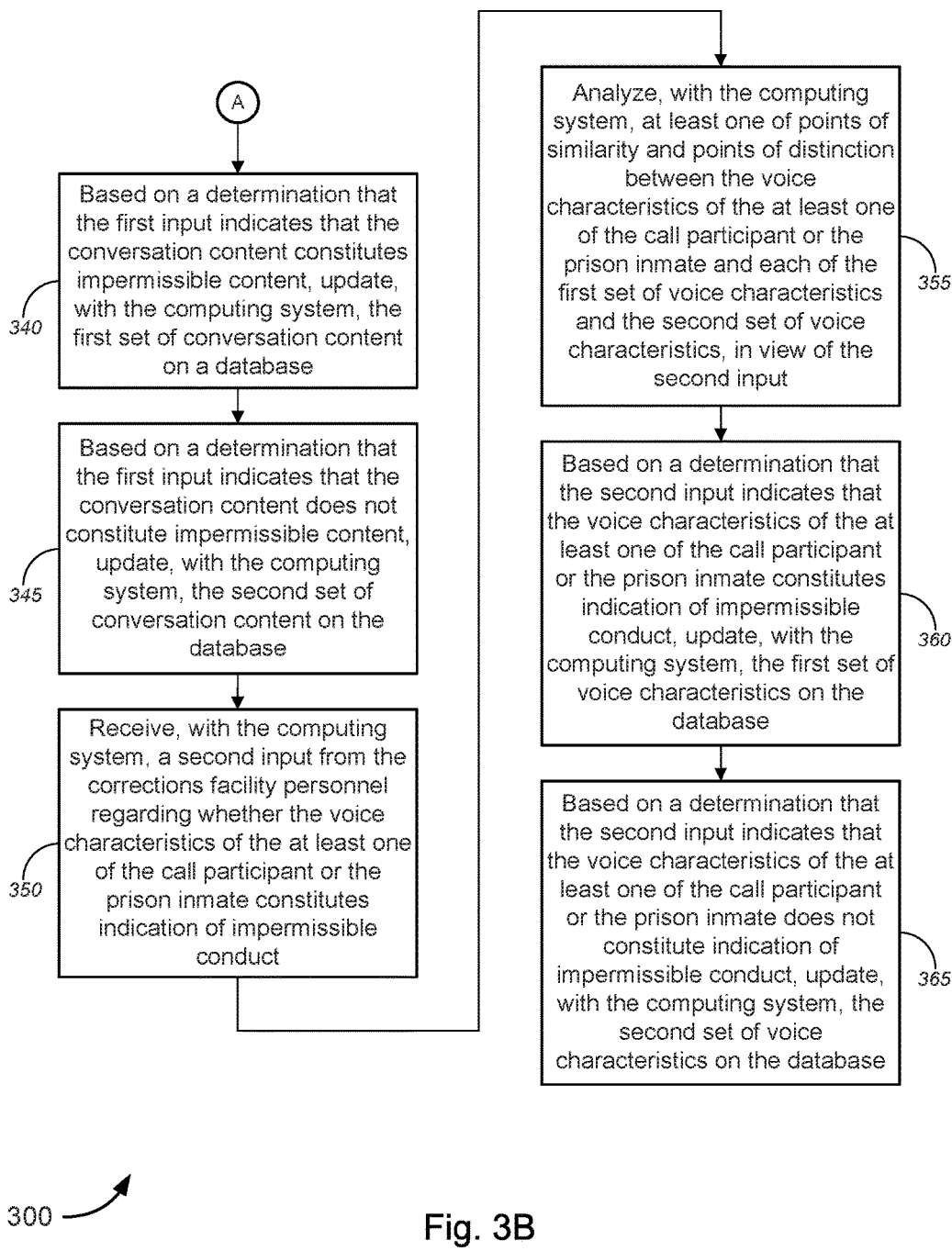

FIGS. 3A and 3B (collectively, "FIG. 3") are schematic diagrams illustrating another method 300 for implementing self-learning corrections facility call monitoring, in accordance with various embodiments. In FIG. 3, method 300 in FIG. 3A continues onto FIG. 3B, linked by the circular marker denoted by "A."

While the techniques and procedures are depicted and/or described in a certain order for purposes of illustration, it should be appreciated that certain procedures may be reordered and/or omitted within the scope of various embodiments. Moreover, while the method 300 illustrated by FIG. 3 can be implemented by or with (and, in some cases, are described below with respect to) the system 100 of FIG. 1 (or components thereof), such methods may also be implemented using any suitable hardware (or software) implementation. Similarly, while the system 100 of FIG. 1 (or components thereof) can operate according to the method 300 illustrated by FIG. 3 (e.g., by executing instructions embodied on a computer readable medium), the system 100 of FIG. 1 can each also operate according to other modes of operation and/or perform other suitable procedures.

With reference to FIG. 3A, method 300 might comprise, at block 305, monitoring, with a computing system (e.g., automated call monitor 140a or 140b of FIG. 1, or the like), a call between a call participant using a user device (e.g., user device 120a-120n, which might include, without limitation, a tablet computer 135a, a smart phone 135b, a mobile phone 135c, a telephone 135d, a desktop computer 135e, a laptop computer 135f, and/or the like, of FIG. 1, and the like) and a prison inmate using a telecommunications device (e.g., telecommunications device 115a-115n, which might include, but is not limited to, a telephone, a video phone, and/or the like, of FIG. 1, and the like). The call, in some cases, might be a voice call over a public switched telephone network ("PSTN"), a voice over Internet Protocol ("VoIP") call over a data network, a video call over a data network, and/or the like. According to some embodiments, the call participant might be a family member or relative, a friend, an acquaintance, a co-worker, a business associate, an employee, some other contact, and/or the like (collectively, "call participant"). Method 400 of FIG. 4, as described below, focuses on embodiments directed to video calls. The prison inmate might be a person (male or female, juvenile or adult) who is incarcerated in a Federal, State, or Municipal corrections facility (i.e., jail or prison), which might be under the authority of the Federal Bureau of Prisons ("BOP"), the Department of Corrections ("DOC") for the particular state (or equivalent State-run agency), the local law enforcement agency or local government, respectively.

At block 310, method 300 might comprise analyzing, with the computing system, conversation content of the call to determine whether the conversation content comprises impermissible content, by comparing the conversation content with at least one of a first set of conversation content that has previously been identified by corrections facility personnel as being impermissible content or a second set of conversation content that has previously been identified by corrections facility personnel as not being impermissible content. As described above, conversation content might include the words (in any language) spoken by the call participant and the prison inmate, and might, in some cases, also include, but are not limited to, vocalizations that are not words, background noises or sounds, and/or the like that are evident or otherwise picked up by the calling device (i.e., by one or both of the telecommunications device or the user device). Impermissible content, in some embodiments, might include, without limitation, at least one of content related to threat of bodily harm, content related to threat of death, content related to blackmail, content related to conspiracy to commit a crime, content related to a past crime, content related to gang activity, or content related to drug trafficking, and/or the like.

Method 300 might further comprise analyzing, with the computing system, voice characteristics of each of the call participant and the prison inmate evident during the call to determine whether the voice characteristics of at least one of the call participant or the prison inmate are indicative of impermissible conduct, by comparing the voice characteristics of each of the call participant and the prison inmate with at least one of a first set of voice characteristics that has previously been identified by corrections facility personnel as being indicative of impermissible conduct or a second set of voice characteristics that has previously been identified by corrections facility personnel as not being indicative of impermissible conduct (block 315). As described above, voice characteristics might include, without limitation, intonation, tone, pitch, timbre, loudness, volume, stutter, pauses between words or sentences, accent, grunts, growls, unique vocal features, cadence, speech fluency, speech disfluency (i.e., use of filler words, like "um," "huh," "uh," "well," "like," or the like, or their equivalents in other languages), mingling of languages, and/or the like, or any combination of these characteristics. According to some embodiments, voice characteristics that are indicative of impermissible conduct comprise at least one of voice characteristics indicative of fear, voice characteristics indicative of anger, voice characteristics indicative of a threat, voice characteristics indicative of maliciousness, voice characteristics indicative of resignation, voice characteristics indicative of hesitation, low vocal tone, high pitched tone, vocal volume, vocal stutter, or growl, and/or the like.

Method 300, at block 320, might comprise, based upon at least one of a determination that the conversation content comprises impermissible content or a determination that the voice characteristics of at least one of the call participant or the prison inmate are indicative of impermissible conduct, flagging, with the computing system, the call for review by corrections facility personnel. At optional block 325, method 300 might comprise recording the call, with the computing system, for further analysis regardless of whether the call is flagged for review by corrections facility personnel (optional block 225). In some cases, the call might be recorded in a database (e.g., database 145a or 145b in FIG. 1, or the like).

Method 300 might further comprise receiving, with the computing system, a first input from the corrections facility personnel regarding whether the conversation content constitutes impermissible content (block 330); analyzing, with the computing system, at least one of points of similarity and points of distinction between the conversation content and each of the first set of conversation content and the second set of conversation content, in view of the first input (block 335); based on a determination that the first input indicates that the conversation content constitutes impermissible content, updating, with the computing system, the first set of conversation content on a database (block 340; in FIG. 3B, following marker "A"), in some cases, further based at least in part on the first input and at least in part on the analysis of the at least one of points of similarity and points of distinction between the conversation content and each of the first set of conversation content and the second set of conversation content; based on a determination that the first input indicates that the conversation content does not constitute impermissible content, updating, with the computing system, the second set of conversation content on the database (block 345), in some instances, further based at least in part on the first input and at least in part on the analysis of the at least one of points of similarity and points of distinction between the conversation content and each of the first set of conversation content and the second set of conversation content; and/or the like. Here, the first input might include any suitable indication by the corrections facility personnel reviewing the conversation content of the call that the conversation content comprises at least one of one or more words, one or more human-generated non-word sounds, one or more background sounds, and/or the like that constitute impermissible content (as described above).

Method 300 might further comprise receiving, with the computing system, a second input from the corrections facility personnel regarding whether the voice characteristics of the at least one of the call participant or the prison inmate constitutes indication of impermissible conduct (block 350); analyzing, with the computing system, at least one of points of similarity and points of distinction between the voice characteristics of the at least one of the call participant or the prison inmate and each of the first set of voice characteristics and the second set of voice characteristics, in view of the second input (block 355); based on a determination that the second input indicates that the voice characteristics of the at least one of the call participant or the prison inmate constitutes indication of impermissible conduct, updating, with the computing system, the first set of voice characteristics on the database (block 360), in some instances, further based at least in part on the second input and at least in part on the analysis of the at least one of points of similarity and points of distinction between the voice characteristics of the at least one of the call participant or the prison inmate and each of the first set of voice characteristics and the second set of voice characteristics; based on a determination that the second input indicates that the voice characteristics of the at least one of the call participant or the prison inmate does not constitute indication of impermissible conduct, updating, with the computing system, the second set of voice characteristics on the database (block 365), in some cases, further based at least in part on the second input and at least in part on the analysis of the at least one of points of similarity and points of distinction between the voice characteristics of the at least one of the call participant or the prison inmate and each of the first set of voice characteristics and the second set of voice characteristics; and/or the like. Here, the second input might include any suitable indication by the corrections facility personnel reviewing the voice characteristics of the call participant and/or the prison inmate that the voice characteristics possess one or a combination of intonation, tone, pitch, timbre, loudness, volume, stutter, pauses between words or sentences, accent, grunts, growls, unique vocal features, cadence, speech fluency, speech disfluency, mingling of languages, and/or the like that constitute indication of impermissible conduct (as described above).

The embodiment of method 300 of FIG. 3 is otherwise similar, if not identical, to that of method 200 of FIG. 2, and similar descriptions apply to the embodiment of method 300 of FIG. 3.

Figure 4:
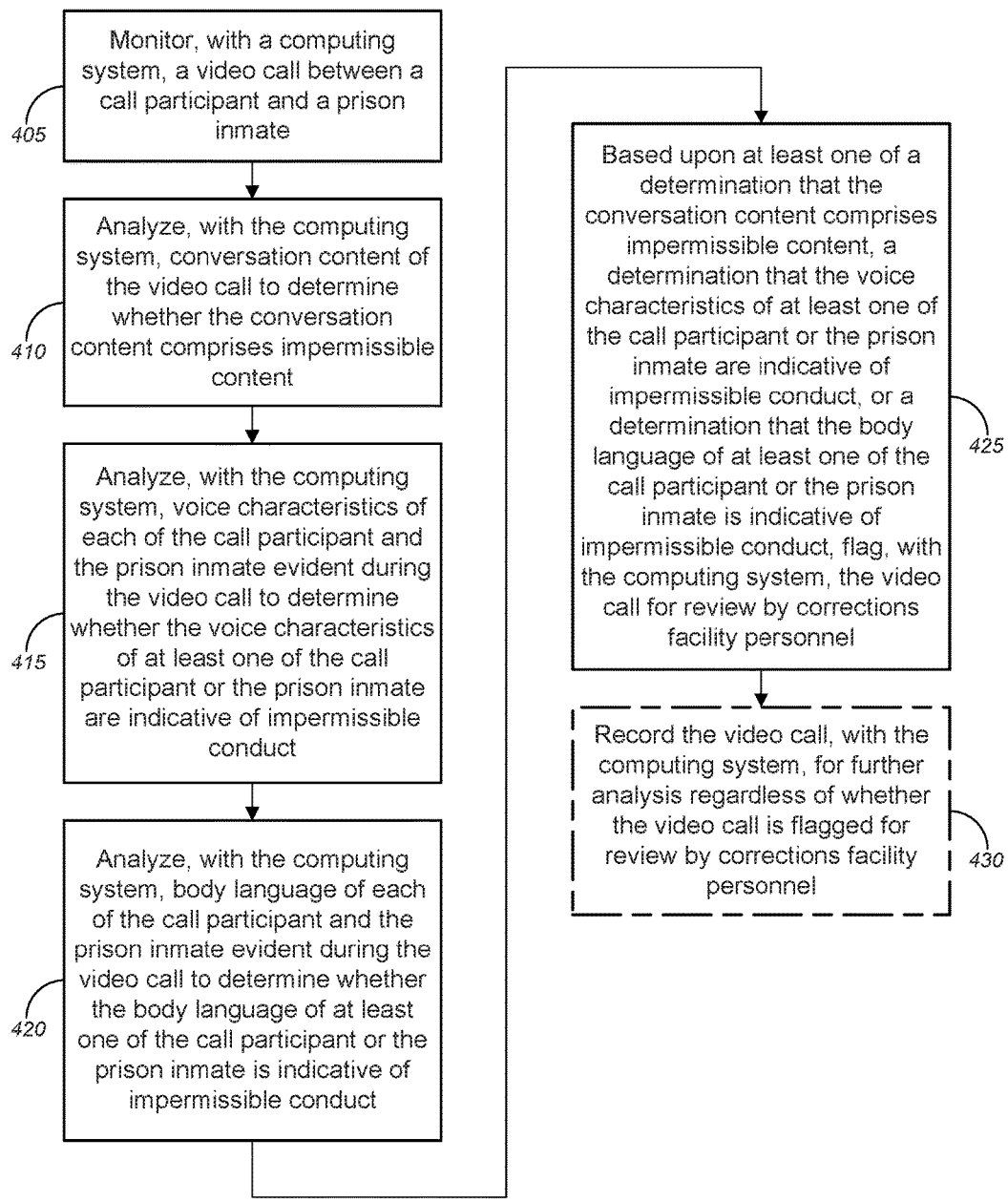
FIG. 4 is a flow diagram illustrating a method for implementing self-learning corrections facility video call monitoring, in accordance with various embodiments.

FIG. 4 is a flow diagram illustrating a method 400 for implementing self-learning corrections facility video call monitoring, in accordance with various embodiments. While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the system 100 of FIG. 1 (or components thereof), such methods may also be implemented using any suitable hardware (or software) implementation. Similarly, while the system 100 of FIG. 1 (or components thereof) can operate according to the method 400 illustrated by FIG. 4 (e.g., by executing instructions embodied on a computer readable medium), the system 100 of FIG. 1 can each also operate according to other modes of operation and/or perform other suitable procedures.

In the embodiment of FIG. 4, method 400, at block 405, might comprise monitoring, with a computing system (e.g., automated call monitor 140a or 140b of FIG. 1, or the like), a video call between a call participant using a user device (e.g., user device 120a-120n, which might include, without limitation, a tablet computer 135a, a smart phone 135b, a desktop computer 135e, a laptop computer 135f, and/or the like, of FIG. 1, and the like) and a prison inmate using a telecommunications device (e.g., telecommunications device 115a-115n, which might include, but is not limited to, a video phone, and/or the like, of FIG. 1, and the like). The video call might be established over a data network (e.g., network 125 of FIG. 1, or the like), and/or the like. According to some embodiments, the call participant might be a family member or relative, a friend, an acquaintance, a co-worker, a business associate, an employee, some other contact, and/or the like (collectively, "call participant"). The prison inmate might be a person (male or female, juvenile or adult) who is incarcerated in a Federal, State, or Municipal corrections facility (i.e., jail or prison), which might be under the authority of the Federal Bureau of Prisons ("BOP"), the Department of Corrections ("DOC") for the particular state (or equivalent State-run agency), the local law enforcement agency or local government, respectively.

At block 410, method 400 might comprise analyzing, with the computing system, conversation content of the video call to determine whether the conversation content comprises impermissible content. As described above, conversation content might include the words (in any language) spoken by the call participant and the prison inmate, and might, in some cases, also include, but are not limited to, vocalizations that are not words, background noises or sounds, and/or the like that are evident or otherwise picked up by the video calling device (i.e., by one or both of the telecommunications device or the user device). Impermissible content, in some embodiments, might include, without limitation, at least one of content related to threat of bodily harm, content related to threat of death, content related to blackmail, content related to conspiracy to commit a crime, content related to a past crime, content related to gang activity, or content related to drug trafficking, and/or the like. Similar to the embodiment of method 200 of FIG. 2B, analyzing conversation content of the video call to determine whether the conversation content comprises impermissible content might comprise one or more of: comparing the conversation content with at least one of a first set of conversation content that has previously been identified by corrections facility personnel as being impermissible content or a second set of conversation content that has previously been identified by corrections facility personnel as not being impermissible content; identifying, with the computing system, one or more coded messages by analyzing key words used by at least one of the call participant or the prison inmate across a plurality of monitored video calls; analyzing, with the computing system, the conversation content of the video call in view of a psychological profile of the prison inmate; and/or the like.

Method 400 might further comprise, at block 415, analyzing, with the computing system, voice characteristics of each of the call participant and the prison inmate evident during the video call to determine whether the voice characteristics of at least one of the call participant or the prison inmate are indicative of impermissible conduct. As described above, voice characteristics might include, without limitation, intonation, tone, pitch, timbre, loudness, volume, stutter, pauses between words or sentences, accent, grunts, growls, unique vocal features, cadence, speech fluency, speech disfluency (i.e., use of filler words, like "um," "huh," "uh," "well," "like," or the like, or their equivalents in other languages), mingling of languages, and/or the like, or any combination of these characteristics. According to some embodiments, voice characteristics that are indicative of impermissible conduct comprise at least one of voice characteristics indicative of fear, voice characteristics indicative of anger, voice characteristics indicative of a threat, voice characteristics indicative of maliciousness, voice characteristics indicative of resignation, voice characteristics indicative of hesitation, low vocal tone, high pitched tone, vocal volume, vocal stutter, or growl, and/or the like. Similar to the embodiment of method 200 of FIG. 2C, analyzing voice characteristics of each of the call participant and the prison inmate evident during the video call to determine whether the voice characteristics of at least one of the call participant or the prison inmate are indicative of impermissible conduct might comprise one or more of: comparing the voice characteristics of each of the call participant and the prison inmate with at least one of a first set of voice characteristics that has previously been identified by corrections facility personnel as being indicative of impermissible conduct or a second set of voice characteristics that has previously been identified by corrections facility personnel as not being indicative of impermissible conduct; identifying, with the computing system, one or more coded messages by analyzing voice characteristics of each of the call participant and the prison inmate in conjunction with key words used by at least one of the call participant or the prison inmate across a plurality of monitored video calls; analyzing, with the computing system, the voice characteristics of the prison inmate in view of a psychological profile of the prison inmate; and/or the like.

Method 400, at block 420, might comprise analyzing, with the computing system, body language of each of the call participant and the prison inmate evident during the video call to determine whether the body language of at least one of the call participant or the prison inmate is indicative of impermissible conduct. As described above, body language might include, but not limited to, movement or state of the head (e.g., tilting of the head upward, downward, to the left-side, to the right-side, or a combination of such movements, and/or the like), movement or state of the eye(s) (e.g., to look straight at the camera (which might imply looking at other person in the video call), to look to the top portion of the screen/camera, to look at the bottom portion of the screen/camera, to look to the sides of the screen/camera, blinking, winking, squinting, staring, dilating, open in fear, wrinkled around the eyes in amusement, or a combination of such movements, and/or the like), movement of the nose (i.e., snorting, expelling breath, and/or the like), movement of the mouth other than talking (e.g., snarling, clenching teeth, baring teeth, biting, licking lips, licking teeth, sticking out the tongue, or any combination of these actions, and/or the like), movement or state of the torso (e.g., toward, away, upward, downward, turned, and/or a combination of these actions relative to the screen/camera, and/or the like), movement of the arms (e.g., bent, straightened, swinging, lifted, against the sides, neutral, hanging, relaxed, upward, downward, to the sides, punching, fist-pounding, hammering, surrendering, closed, folded, open, stretched wide, or a combination of these actions, and/or the like), movement or state of the hands (e.g., closing hand(s) in a fist(s), clenching fists, scratching, swiping, pushing, pulling, slapping, saluting, knuckle-cracking, chopping, jabbing, finger-pointing, finger-stabbing, open handed, claw-like, movement or state of the fingers, or a combination of these actions, and/or the like), movement or state of the body (e.g., tensing muscles, pacing, huddling, balling, jumping, leaning forward, leaning to the side, leaning back, tapping feet, shaking, shivering, twitching, or a combination of these actions, and/or the like), or a combination of these movements or states of body parts, and/or the like.

According to some embodiments, body language that are indicative of impermissible conduct might include, without limitation, at least one of body language indicative of fear, body language indicative of anger, body language indicative of a threat, body language indicative of maliciousness, body language indicative of resignation, body language indicative of hesitation, tensed muscles, clenched teeth, angry eyes, sad eyes, fearful eyes, puffed chest muscles, huddled stance, looking away, staring with intensity, first pounding, foot stomping, looking down, avoiding eye contact, baring teeth, and/or the like. Similar to the embodiment of method 200 of FIG. 2C, analyzing body language of each of the call participant and the prison inmate evident during the video call to determine whether the body language of at least one of the call participant or the prison inmate is indicative of impermissible conduct might comprise one or more of: comparing the body language of each of the call participant and the prison inmate with at least one of a first set of body language that has previously been identified by corrections facility personnel as being indicative of impermissible conduct or a second set of body language that has previously been identified by corrections facility personnel as not being indicative of impermissible conduct; identifying, with the computing system, one or more coded messages by analyzing body language of each of the call participant and the prison inmate in conjunction with key words used by at least one of the call participant or the prison inmate across a plurality of monitored video calls; analyzing, with the computing system, the body language of the prison inmate in view of a psychological profile of the prison inmate; and/or the like.

At block 425, method 400 might comprise, based upon at least one of a determination that the conversation content comprises impermissible content, a determination that the voice characteristics of at least one of the call participant or the prison inmate are indicative of impermissible conduct, and/or a determination that the body language of at least one of the call participant or the prison inmate is indicative of impermissible conduct, flagging, with the computing system, the video call for review by corrections facility personnel. According to some embodiments, method 400 might further comprise recording the video call, with the computing system, for further analysis regardless of whether the video call is flagged for review by corrections facility personnel (optional block 430). In some cases, the video call might be recorded in a database (e.g., database 145*a* or 145*b* in FIG. 1, or the like).

The embodiment of method 400 of FIG. 4 is otherwise similar, if not identical, to that of method 200 of FIG. 2 or method 300 of FIG. 3, and similar descriptions apply to the embodiment of method 400 of FIG. 4.

Exemplary System and Hardware Implementation

Figure 5:
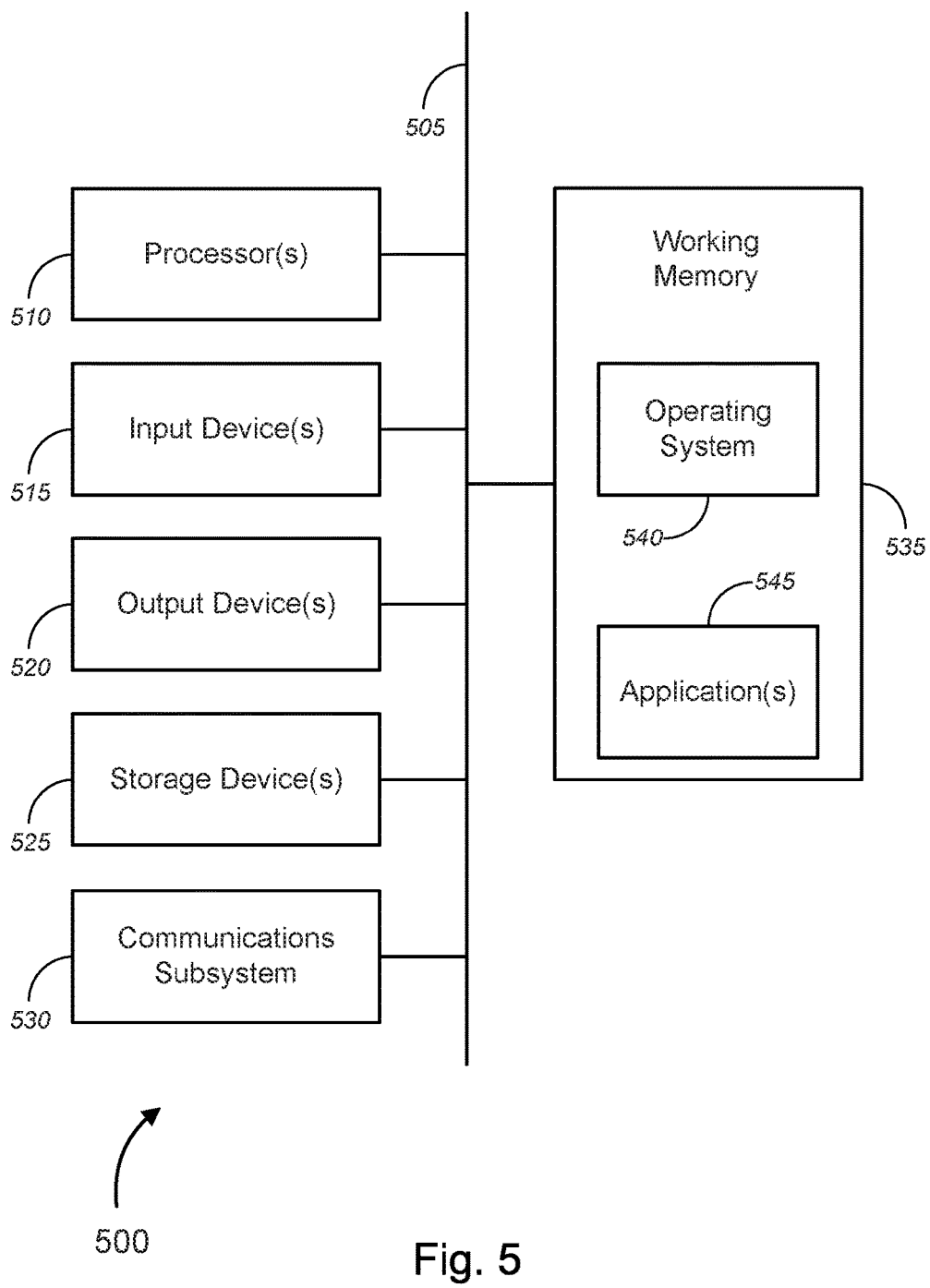
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., network switch 110, automated call monitor 140a and/or 140b, telecommunications devices 115a-115n, user devices 120a-120n and 135a-135f, corrections facility personnel devices 150 and 150a-150f, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., network switch 110, automated call monitor 140a and/or 140b, telecommunications devices 115a-115n, user devices 120a-120n and 135a-135f, corrections facility personnel devices 150 and 150a-150f, etc.), described above with respect to FIG. 1—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, sensors, and/or the like; and one or more output devices 520, which can include, without limitation, a display device, a printer, indicator lights, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, apps, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
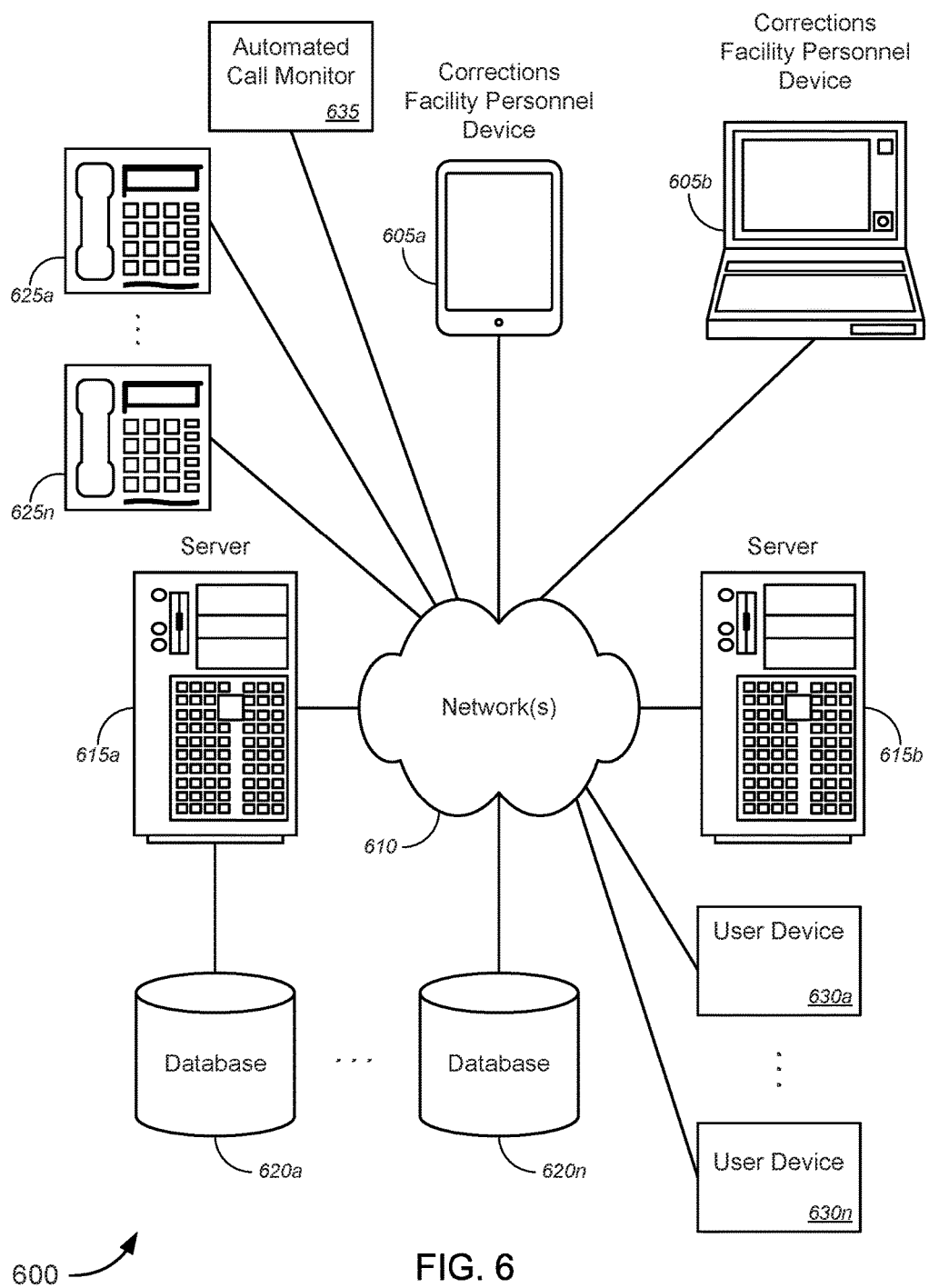
FIG. 6 is a block diagram illustrating a networked system of computers, computing systems, or system hardware architecture, which can be used in accordance with various embodiments.

As noted above, a set of embodiments comprises methods and systems for implementing call monitoring, and, in particular embodiments, to methods, systems, apparatuses, and computer software for implementing self-learning corrections facility call monitoring. FIG. 6 illustrates a schematic diagram of a system 600 that can be used in accordance with one set of embodiments. The system 600 can include one or more corrections facility personnel devices or equipment 605. A corrections facility personnel device or equipment 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A corrections facility personnel device or equipment 605 can also have any of a variety of applications, including one or more applications configured to perform methods provided by various embodiments (as described above, for example), as well as one or more office applications, database client and/or server applications, and/or web browser applications. Alternatively, a corrections facility personnel device or equipment 605 can be any other electronic device, such as a thin-client computer, Internet-enabled mobile telephone, smart phone, and/or personal digital assistant, capable of communicating via a network (e.g., the network(s) 610 described below) and/or of displaying and navigating web pages or other types of electronic documents. Although the exemplary system 600 is shown with two corrections facility personnel devices or equipment 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from corrections facility personnel device or equipment 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the corrections facility personnel devices or equipment 605 to perform methods of the invention.

The server computers 615, in some embodiments, might include one or more application servers, which can be configured with one or more applications accessible by a client running on one or more of the corrections facility personnel devices or equipment 605 and/or other servers 615. Merely by way of example, the server(s) 615 can be one or more general purpose computers capable of executing programs or scripts in response to the corrections facility personnel devices or equipment 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a corrections facility personnel device or equipment 605 and/or another server 615. In some embodiments, an application server can perform one or more of the processes for implementing call monitoring, and, in particular embodiments, for implementing self-learning corrections facility call monitoring, or the like, as described in detail above. Data provided by an application server may be formatted as one or more web pages (comprising HTML, JavaScript, etc., for example) and/or may be forwarded to a corrections facility personnel device or equipment 605 via a web server (as described above, for example). Similarly, a web server might receive web page requests and/or input data from a corrections facility personnel device or equipment 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a corrections facility personnel device or equipment 605 and/or another server 615. Alternatively, as those skilled in the art will appreciate, a file server can include all necessary files, allowing such an application to be invoked remotely by a corrections facility personnel device or equipment 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a corrections facility personnel device or equipment 605). Alternatively, a database 620n can be remote from any or all of the devices 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the devices 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise one or more telecommunications devices 625a-625n (collectively, "telecommunications devices 625"), which might correspond to one or more of telecommunications devices 115a-115n of FIG. 1 or the like, which one or more prison inmates might use to communicate with family, friends, or acquaintances, and the like. System 600 might also comprise one or more user devices 630a-630n (collectively, "user devices 630), which the family, friends, and/or acquaintances of the one or more prison inmates would use to communicate with the one or more prison inmates; the one or more user devices 630 might correspond to user devices 120a-120n and 135a-135f of FIG. 1 or the like. System 600 might further comprise an automated call monitor 635, which might correspond to automated call monitor 140a or 140b.

During a telephone or video call between a prison inmate (using one of the telecommunications devices 625) and an external call participant (i.e., family, friend, or acquaintance of the prison inmate; using one of the user devices 630), the automated call monitor 635 and/or one of the servers 615 might monitor the telephone or video call; might analyze the at least one of conversation content of the conversation between the prison inmate and the external call participant, voice characteristics of the prison inmate and/or the external call participant during the call, and/or (for a video call) body language of the prison inmate and/or the external call participant during the call, and/or the like; and might flag the call if at least one of the following occurs: (a) it is determined that the conversation content comprises impermissible content (including, but not limited to, at least one of content related to threat of bodily harm, content related to threat of death, content related to blackmail, content related to conspiracy to commit a crime, content related to a past crime, content related to gang activity, or content related to drug trafficking, and/or the like); (b) it is determined that the voice characteristics of at least one of the external call participant or the prison inmate are indicative of impermissible conduct (where such voice characteristics might include, without limitation, at least one of voice characteristics indicative of fear, voice characteristics indicative of anger, voice characteristics indicative of a threat, voice characteristics indicative of maliciousness, voice characteristics indicative of resignation, voice characteristics indicative of hesitation, low vocal tone, high pitched tone, vocal volume, vocal stutter, or growl, and/or the like); and/or (c) it is determined that the body language of at least one of the call participant or the prison inmate is indicative of impermissible conduct (where such body language might include, but is not limited to, at least one of body language indicative of fear, body language indicative of anger, body language indicative of a threat, body language indicative of maliciousness, body language indicative of resignation, body language indicative of hesitation, tensed muscles, clenched teeth, angry eyes, sad eyes, fearful eyes, puffed chest muscles, huddled stance, looking away, staring with intensity, first pounding, foot stomping, looking down, avoiding eye contact, baring teeth, and/or the like). FIGS. 1-4, as described in greater detail above, illustrate the various embodiments of the systems and methods for implementing self-learning corrections facility call monitoring.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for implementing self-learning corrections facility call monitoring, comprising:
    monitoring, with a computing system, a call between an original call participant and a prison inmate;
    analyzing, with the computing system, conversation content of the call to determine whether the conversation content comprises impermissible content;
    analyzing, with the computing system, voice characteristics of each of the original call participant and the prison inmate evident during the call to determine whether the voice characteristics of at least one of the original call participant or the prison inmate are indicative of impermissible conduct conducted by at least one of the original call participant or the prison inmate, wherein the voice characteristics of each of the original call participant and the prison inmate that are monitored for and are indicative of impermissible conduct comprise at least one of voice characteristics indicative of fear, voice characteristics indicative of anger, voice characteristics indicative of a threat, voice characteristics indicative of maliciousness, voice characteristics indicative of resignation, voice characteristics indicative of hesitation, vocal stutter, or growl;
    identifying, with the computing system, one or more coded messages by analyzing the voice characteristics of each of the original call participant and the prison inmate in conjunction with key words used by at least one of the original call participant or the prison inmate across a plurality of monitored calls; and
    based upon at least one of a determination that the conversation content comprises impermissible content or a determination that the voice characteristics of at least one of the original call participant or the prison inmate are indicative of impermissible conduct, conducted by at least one of the original call participant or the prison inmate, flagging, with the computing system, the call for review by corrections facility personnel.

2. The method of claim 1, wherein analyzing, with the computing system, the conversation content of the call to determine whether the conversation content comprises impermissible content comprises analyzing, with the computing system, the conversation content of the call, by comparing the conversation content with at least one of a first set of conversation content that has previously been identified by corrections facility personnel as being impermissible content or a second set of conversation content that has previously been identified by corrections facility personnel as not being impermissible content.

3. The method of claim 2, further comprising:
    receiving, with the computing system, a first input from the corrections facility personnel regarding whether the conversation content constitutes impermissible content;
    based on a determination that the first input indicates that the conversation content constitutes impermissible content, updating, with the computing system, the first set of conversation content on a database; and
    based on a determination that the first input indicates that the conversation content does not constitute impermissible content, updating, with the computing system, the second set of conversation content on the database.

4. The method of claim 3, further comprising:
    analyzing, with the computing system, at least one of points of similarity and points of distinction between the conversation content and each of the first set of conversation content and the second set of conversation content, in view of the first input;
    wherein updating the first set of conversation content on the database comprises updating, with the computing system, the first set of conversation content on the database, based at least in part on the first input and at least in part on the analysis of the at least one of points of similarity and points of distinction between the conversation content and each of the first set of conversation content and the second set of conversation content; and
    wherein updating the second set of conversation content on the database comprises updating, with the computing system, the second set of conversation content on the database, based at least in part on the first input and at least in part on the analysis of the at least one of points of similarity and points of distinction between the conversation content and each of the first set of conversation content and the second set of conversation content.

5. The method of claim 1, wherein analyzing, with the computing system, the voice characteristics of each of the original call participant and the prison inmate evident during the call to determine whether the voice characteristics of at least one of the original call participant or the prison inmate are indicative of impermissible conduct comprises analyzing, with the computing system, the voice characteristics of each of the original call participant and the prison inmate evident during the call, by comparing the voice characteristics of each of the original call participant and the prison inmate with at least one of a first set of voice characteristics that has previously been identified by corrections facility personnel as being indicative of impermissible conduct or a second set of voice characteristics that has previously been identified by corrections facility personnel as not being indicative of impermissible conduct.

6. The method of claim 5, further comprising:
receiving, with the computing system, a second input from the corrections facility personnel regarding whether the voice characteristics of the at least one of the original call participant or the prison inmate constitutes indication of impermissible conduct;
based on a determination that the second input indicates that the voice characteristics of the at least one of the original call participant or the prison inmate constitutes indication of impermissible conduct, updating, with the computing system, the first set of voice characteristics on a database; and
based on a determination that the second input indicates that the voice characteristics of the at least one of the original call participant or the prison inmate does not constitute indication of impermissible conduct, updating, with the computing system, the second set of voice characteristics on the database.

7. The method of claim 6, further comprising:
analyzing, with the computing system, at least one of points of similarity and points of distinction between the voice characteristics of the at least one of the original call participant or the prison inmate and each of the first set of voice characteristics and the second set of voice characteristics, in view of the second input;
wherein updating the first set of voice characteristics on the database comprises updating, with the computing system, the first set of voice characteristics on the database, based at least in part on the second input and at least in part on the analysis of the at least one of points of similarity and points of distinction between the voice characteristics of the at least one of the original call participant or the prison inmate and each of the first set of voice characteristics and the second set of voice characteristics; and
wherein updating the second set of voice characteristics on the database comprises updating, with the computing system, the second set of voice characteristics on the database, based at least in part on the second input and at least in part on the analysis of the at least one of points of similarity and points of distinction between the voice characteristics of the at least one of the original call participant or the prison inmate and each of the first set of voice characteristics and the second set of voice characteristics.

8. The method of claim 1, wherein impermissible content comprises at least one of content related to threat of bodily harm, content related to threat of death, content related to blackmail, content related to conspiracy to commit a crime, content related to a past crime, content related to gang activity, or content related to drug trafficking.

9. The method of claim 1, wherein voice characteristics that are monitored for and are indicative of impermissible conduct further comprise at least one of low vocal tone, high pitched tone, or vocal volume.

10. The method of claim 1, wherein analyzing the conversation content of the call comprises identifying, with the computing system, one or more coded messages by analyzing key words used by at least one of the original call participant or the prison inmate across a plurality of monitored calls.

11. The method of claim 1, wherein analyzing the conversation content of the call comprises analyzing, with the computing system, the conversation content of the call in view of a psychological profile of the prison inmate.

12. The method of claim 1, wherein analyzing the voice characteristics of the prison inmate comprises analyzing, with the computing system, the voice characteristics of the prison inmate in view of a psychological profile of the prison inmate.

13. The method of claim 1, further comprising:
recording the call, with the computing system, for further analysis regardless of whether the call is flagged for review by corrections facility personnel.

14. The method of claim 1, wherein the call is a video call, wherein the method further comprises:
analyzing, with the computing system, body language of each of the original call participant and the prison inmate evident during the call to determine whether the body language of at least one of the original call participant or the prison inmate is indicative of impermissible conduct;
wherein flagging the call for review by corrections facility personnel is further based upon a determination that the body language of at least one of the original call participant or the prison inmate is indicative of impermissible conduct.

15. The method of claim 1, further comprises:
identifying, with the computing system, one or more coded messages by analyzing body language of each of the original call participant and the prison inmate in conjunction with key words used by at least one of the original call participant or the prison inmate across a plurality of monitored calls.

16. An apparatus for implementing self-learning corrections facility call monitoring, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
monitor a call between an original call participant and a prison inmate;
analyze conversation content of the call to determine whether the conversation content comprises impermissible content;
analyze voice characteristics of each of the original call participant and the prison inmate evident during the call to determine whether the voice characteristics of at least one of the original call participant or the prison inmate are indicative of impermissible conduct conducted by at least one of the original call participant or the prison inmate, wherein the voice characteristics of each of the original call participant and the prison inmate that are monitored for and are indicative of impermissible conduct comprise at least one of voice characteristics indicative of fear, voice characteristics indicative of anger, voice characteristics indicative of a threat, voice characteristics indicative of maliciousness, voice characteristics indicative of resignation, voice characteristics indicative of hesitation, vocal stutter, or growl;
identify one or more coded messages by analyzing the voice characteristics of each of the original call participant and the prison inmate in conjunction with key words used by at least one of the original call participant or the prison inmate across a plurality of monitored calls; and
based upon at least one of a determination that the conversation content comprises impermissible content or a determination that the voice characteristics of at least one of the call participant or the prison inmate are indicative of impermissible conduct conducted by at least one of the original call participant or the prison inmate, flag the call for review by corrections facility personnel.

17. The apparatus of claim 16, wherein analyzing the conversation content of the call to determine whether the conversation content comprises impermissible content comprises analyzing the conversation content of the call, by comparing the conversation content with at least one of a first set of conversation content that has previously been identified by corrections facility personnel as being impermissible content or a second set of conversation content that has previously been identified by corrections facility personnel as not being impermissible content.

18. The apparatus of claim 17, wherein the set of instructions, when executed by the at least one processor, further causes the apparatus to:
receive a first input from the corrections facility personnel regarding whether the conversation content constitutes impermissible content;
based on a determination that the first input indicates that the conversation content constitutes impermissible content, update the first set of conversation content on a database; and
based on a determination that the first input indicates that the conversation content does not constitute impermissible content, update the second set of conversation content on the database.

19. The apparatus of claim 16, wherein analyzing the voice characteristics of each of the original call participant and the prison inmate evident during the call to determine whether the voice characteristics of at least one of the original call participant or the prison inmate are indicative of impermissible conduct comprises analyzing the voice characteristics of each of the original call participant and the prison inmate evident during the call, by comparing the voice characteristics of each of the original call participant and the prison inmate with at least one of a first set of voice characteristics that has previously been identified by corrections facility personnel as being indicative of impermissible conduct or a second set of voice characteristics that has previously been identified by corrections facility personnel as not being indicative of impermissible conduct.

20. The apparatus of claim 19, wherein the set of instructions, when executed by the at least one processor, further causes the apparatus to:
receive a second input from the corrections facility personnel regarding whether the voice characteristics of the at least one of the original call participant or the prison inmate constitutes indication of impermissible conduct;
based on a determination that the second input indicates that the voice characteristics of the at least one of the original call participant or the prison inmate constitutes indication of impermissible conduct, update the first set of voice characteristics on a database; and
based on a determination that the second input indicates that the voice characteristics of the at least one of the original call participant or the prison inmate does not constitute indication of impermissible conduct, update the second set of voice characteristics on the database.

21. The apparatus of claim 16, wherein impermissible content comprises at least one of content related to threat of bodily harm, content related to threat of death, content related to blackmail, content related to conspiracy to commit a crime, content related to a past crime, content related to gang activity, or content related to drug trafficking.

22. The apparatus of claim 16, wherein voice characteristics that are monitored and are indicative of impermissible conduct further comprise at least one of low vocal tone, high pitched tone, or vocal volume.

23. The apparatus of claim 16, wherein analyzing the conversation content of the call comprises identifying one or more coded messages by analyzing key words used by at least one of the original call participant or the prison inmate across a plurality of calls.

24. The apparatus of claim 16, analyzing the conversation content of the call comprises analyzing the conversation content of the call in view of a psychological profile of the prison inmate.

25. The apparatus of claim 16, wherein analyzing the voice characteristics of the prison inmate comprises analyzing the voice characteristics of the prison inmate in view of a psychological profile of the prison inmate.

26. The apparatus of claim 16, wherein the set of instructions, when executed by the at least one processor, further causes the apparatus to:
record the call for further analysis regardless of whether the call is flagged for review by corrections facility personnel.

27. A system for implementing self-learning corrections facility call monitoring, comprising:
a prison telephone in communication with an external telephone, a call being established between an original call participant using the external telephone and a prison inmate using the prison telephone; and
an automated call monitor, comprising:
at least one processor; and
a non-transitory computer readable medium communicatively coupled to the at least one processor, the non-transitory computer readable medium having stored thereon computer software comprising a set of instructions that, when executed by the at least one processor, causes the automated call monitor to:
monitor the call between the original call participant and the prison inmate;
analyze conversation content of the call to determine whether the conversation content comprises impermissible content;
analyze voice characteristics of each of the original call participant and the prison inmate evident during the call to determine whether the voice characteristics of at least one of the original call participant or the prison inmate are indicative of impermissible conduct conducted by at least one of the original call participant or the prison inmate, wherein the voice characteristics of each of the original call participant and the prison inmate that are monitored for and are indicative of impermissible conduct comprise at least one of voice characteristics indicative of fear, voice characteristics indicative of anger, voice characteristics indicative of a threat, voice characteristics indicative of maliciousness, voice characteristics indicative of resignation, voice characteristics indicative of hesitation, vocal stutter, or growl;
identify one or more coded messages by analyzing the voice characteristics of each of the original call participant and the prison inmate in conjunction with key words used by at least one of the original call participant or the prison inmate across a plurality of monitored calls; and
based upon at least one of a determination that the conversation content comprises impermissible content or a determination that the voice characteristics of at least one of the original call participant or the prison inmate are indicative of impermissible conduct, flag the call for review by corrections facility personnel.

* * * * *